United States Patent
Motomura et al.

(10) Patent No.: US 10,349,475 B2
(45) Date of Patent: Jul. 9, 2019

(54) SIGNAL RECEIVING DEVICE, SIGNAL TRANSMITTING DEVICE, LIGHTING SYSTEM, ILLUMINATION FIXTURE AND ILLUMINATION SYSTEM

(71) Applicant: Panasonic Intellectual Property Management Co., Ltd., Osaka (JP)

(72) Inventors: Masashi Motomura, Osaka (JP); Hirofumi Konishi, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 15/660,509

(22) Filed: Jul. 26, 2017

(65) Prior Publication Data

US 2018/0035501 A1    Feb. 1, 2018

(30) Foreign Application Priority Data

Jul. 29, 2016  (JP) ................. 2016-150046

(51) Int. Cl.
- *H05B 33/00* (2006.01)
- *H05B 33/08* (2006.01)
- *H02M 1/42* (2007.01)
- *H05B 37/02* (2006.01)

(52) U.S. Cl.
CPC .......... *H05B 33/0815* (2013.01); *H02M 1/42* (2013.01); *H05B 33/0848* (2013.01); *H05B 37/0263* (2013.01); *H05B 37/0272* (2013.01)

(58) Field of Classification Search
CPC .... H02M 3/07; H02M 3/1582; H02M 5/2573; H02M 7/06; H02M 3/156; H05B 37/0263; H05B 33/0851; H05B 37/0272; H05B 33/0803; H05B 33/0818; H05B 33/083; H05B 33/0857; H05B 37/02; H05B 1/025
See application file for complete search history.

(56) References Cited

U.S. PATENT DOCUMENTS

2009/0201231 A1* 8/2009 Takahara ............. G09G 3/3233
                                                                345/76
2017/0019971 A1* 1/2017 Hashimoto ........ H05B 33/0854

FOREIGN PATENT DOCUMENTS

JP        2009-159653 A     7/2009

\* cited by examiner

*Primary Examiner* — Monica C King
(74) *Attorney, Agent, or Firm* — Renner, Otto, Boisselle & Sklar, LLP

(57) ABSTRACT

A receiver circuit is configured to receive a transmission signal represented by a change in DC voltage applied across power supply lines according to transmission data. The receiver circuit is also configured to compare the DC voltage (sampled value(s) of a detection voltage) with a threshold, thereby detecting a change in the DC voltage. The receiver circuit is further configured to calculate the threshold from a voltage value of the DC voltage (the sampled value(s) of a detection voltage) input to a receiver input unit.

9 Claims, 8 Drawing Sheets

SIGNAL RECEIVING DEVICE, SIGNAL TRANSMITTING DEVICE, LIGHTING SYSTEM, ILLUMINATION FIXTURE AND ILLUMINATION SYSTEM

CROSS REFERENCE TO RELATED APPLICATION

This application claims the benefit and priority of Japanese Patent Application No. 2016-150046, filed on Jul. 29, 2016, the entire contents of which is incorporated herein by reference.

TECHNICAL FIELD

The present disclosure relates to signal receiving devices, signal transmitting devices, lighting systems, illumination fixtures, and illumination systems. Specifically, the present disclosure relates to a signal receiving device configured to receive a transmission signal to be transmitted by changing a DC voltage (a voltage level thereof). The present disclosure also relates to a signal transmitting device configured to transmit the transmission signal to the signal receiving device. The present disclosure further relates to: a lighting system including the signal transmitting device and a lighting device; an illumination fixture including the signal receiving device, the lighting device and a light source; an illumination system including the lighting system and the light source; and an illumination system including the signal transmitting device and the illumination fixture.

BACKGROUND ART

An illumination system described in Document 1 (JP 2009-159653 A) is exemplified as associated technology. The illumination system has one or more illumination fixtures that are electrically connected directly to DC wiring in premises or electrically connected to the DC wiring via a wiring accessory such as a ceiling rose (JIS C 8310). The DC wiring is composed of, for example two DC supply lines and electrically connected to a DC power supply that is converted from an AC power supply such as a commercial power supply via an AC (alternating current)/DC (Direct Current) converter provided in a home distribution board. The illumination fixture includes a light source that is turned on (emits light) by a DC voltage, such as LEDs (Light Emitting Diodes) or organic electroluminescence elements. That is, the illumination fixture is turned on by DC power to be supplied via the DC supply lines, and therefore need not include a power supply circuit such as an AC/DC converter in order to convert an AC voltage into a DC voltage.

With the illumination system described in Document 1, the DC supply lines function not only as supply lines of the DC power but also as communication path (transmission path). For example, a communication signal (a transmission signal) for transmitting data over high frequency carrier wave is superposed on a DC voltage. A switch device connected to the DC supply lines transmits a control instruction (e.g., turning on, off and dimming) to the illumination fixture by the transmission signal superposed on the DC voltage. The illumination fixture receives the transmission signal from the switch device to turn on, off or dim the light source according to the control instruction contained in the transmission signal.

Superposing a transmission signal obtained by modulating high frequency carrier wave on a DC voltage as the illumination system described in Document 1 may cause electromagnetic radiation (noise) through indoor wiring functioning as an antenna or a leakage of a transmission signal (noise) into neighboring houses via power line. This sort of illumination system accordingly needs reduction of the noise caused by the transmission and reception of the transmission signal (transmission data). In addition, the susceptibility to noise of the transmission signal may increase as the length of the indoor wiring is longer because a signal voltage of the transmission signal may decrease (i.e., become attenuated). Therefore, what is desired is to prevent the susceptibility to noise of the transmission signal from increasing.

SUMMARY

It is an object of the present disclosure to provide a signal receiving device, a signal transmitting device, a lighting system, an illumination fixture and an illumination system, capable of avoiding the transmission signal being susceptible to noise.

A signal receiving device according to an aspect of the present disclosure includes a receiver input unit and a receiver circuit. The receiver input unit includes input terminals and allows power supply lines to be electrically connected to. The receiver circuit is (operatively) coupled to the receiver input unit, and configured to receive a transmission signal represented by a change in DC voltage (the voltage level thereof) applied across the power supply lines according to transmission data. The receiver circuit is configured to compare the DC voltage (the voltage level thereof) with a threshold, thereby detecting the change in the DC voltage (the voltage level). The receiver circuit is configured to calculate the threshold from a voltage value of the DC voltage input to the receiver input unit.

A signal transmitting device according to an aspect of the present disclosure includes an input unit, an output unit, a voltage converter circuit and a control circuit. The input unit includes input terminals and is configured to receive a first DC voltage. The output unit includes output terminals and is configured to output a second DC voltage. The voltage converter circuit is configured to convert the first DC voltage into the second DC voltage. The control circuit is configured to control the voltage converter circuit so that the second DC voltage (a voltage level thereof) is changed to a DC voltage level according to transmission data, during a prescribed transmission time period.

A lighting system according to an aspect of the present disclosure includes the signal receiving device in the above-mentioned aspect, a signal transmitting device and a lighting device. The signal transmitting device includes an input unit, an output unit, a voltage converter circuit and a control circuit. The input unit includes input terminals and is configured to receive a first DC voltage. The output unit includes output terminals and is configured to output a second DC voltage. The voltage converter circuit is configured to convert the first DC voltage into the second DC voltage. The control circuit is configured to control the voltage converter circuit so that the second DC voltage (a voltage level thereof) is changed to a DC voltage level according to the transmission data, during a prescribed transmission time period. The receiver circuit of the signal receiving device is configured to compare the second DC voltage (the voltage level thereof) with the threshold, thereby detecting the change in the second DC voltage (the voltage level). The lighting device is configured to light a light source by the second DC voltage supplied via the power supply lines. The receiver circuit is further configured to change a state of the light source via the lighting device according to the transmission signal received with the receiver circuit.

An illumination fixture according to an aspect of the present disclosure includes the signal receiving device in the abovementioned aspect, a light source and a lighting device configured to light the light source. The lighting device is configured to change a state of the light source according to the transmission data acquired through the receiver circuit.

An illumination system according to an aspect of the present disclosure includes the lighting system in the abovementioned aspect, and the light source to be lit by the lighting device of the lighting system.

BRIEF DESCRIPTION OF THE DRAWINGS

The figures depict one or more implementations in accordance with the present teaching, by way of example only, not by way of limitation. In the figures, like reference numerals refer to the same or similar elements where.

DETAILED DESCRIPTION

Hereinafter, a signal receiving device, a lighting system, an illumination fixture and an illumination system will be explained with reference to the drawings.

Figure 1:
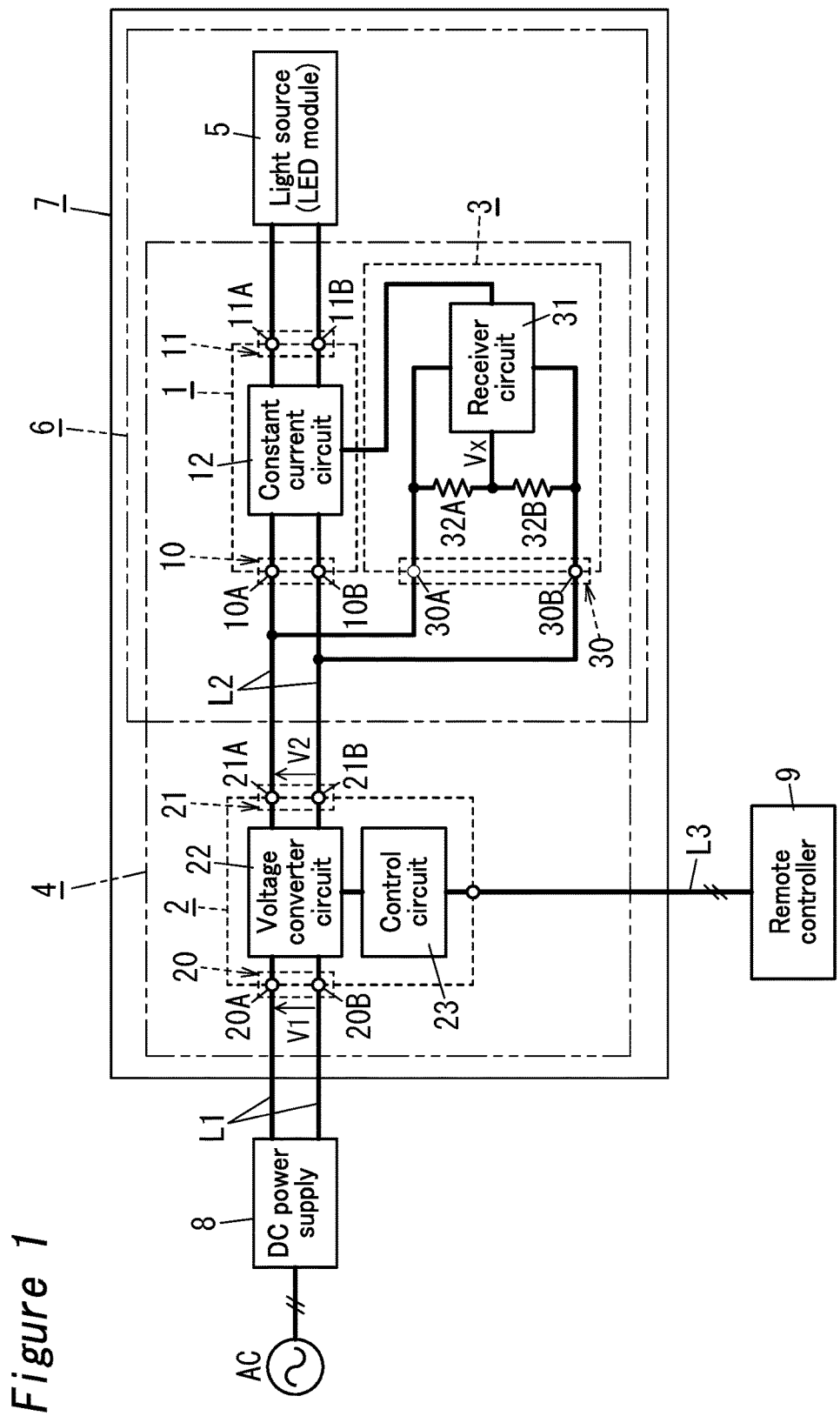
FIG. 1 is a block diagram showing a signal receiving device, a lighting system, an illumination fixture and an illumination system, in accordance with an embodiment of the present disclosure.

As shown in FIG. 1, the lighting system 4 preferably has a lighting device 1, a signal transmitting device 2 and the signal receiving device 3. Note that the lighting system 4 is preferably installed in a living room of a dwelling but may be installed in premises such as business offices and shops in a commercial facility. The lighting system 4 may also be installed in cabins in a plane (a passenger aircraft), a train, a ship or the like.

Preferably, the signal transmitting device 2 includes an input unit 20, an output unit 21, a voltage converter circuit 22 and a control circuit 23. The input unit 20 has a pair of first and second input terminals 20A and 20B, respectively. Preferably, each of the first and second input terminals 20A and 20B includes, for example a screw terminal or a quick connection terminal. The input unit 20 may allow first power supply lines L1 to be electrically connected to and be configured to receive a DC voltage (a first DC voltage V1) via the first power supply lines L1. The first power supply lines L1 may be composed of two electric wires. One of the two electric wires may electrically connect the first input terminal 20A and a positive output terminal of a DC power supply 8, while the other may electrically connect the second input terminal 20B and a negative output terminal of the DC power supply 8.

Preferably, the DC power supply 8 is configured to convert an AC voltage from a utility grid AC into a DC voltage to output the DC voltage to the first power supply lines L1 from the positive and negative output terminals. Note that in Japan the AC voltage from the utility grid AC is, for example an AC voltage, an effective value and a power frequency of which are 100[V] and 50 [Hz] or 60 [Hz], respectively. The DC voltage that is output from the DC power supply 8 is, for example a DC voltage with a rated value of about 30 to 40 [V]. The DC power supply 8 includes, for example an input filter, a full-wave rectifier, a power factor correction circuit, and a DC/DC converter such as a step-down chopper circuit (not shown). The DC power supply 8 is preferably built in a distribution board for indoor wiring such as a house distribution board. However, the circuit configuration of the abovementioned DC power supply 8 is merely one example, and may also be a circuit configuration in which a DC voltage from a photovoltaic system is increased or decreased to a prescribed DC voltage to be output to the first power supply lines L1. Note that the signal transmitting device 2 may be provided with an AC/DC converter configured to convert the AC voltage from the utility grid AC into the DC voltage in place of the DC power supply 8.

Preferably, the voltage converter circuit 22 of the signal transmitting device 2 is configured to convert the first DC voltage V1 from the input unit 20 into a second DC voltage V2 (see FIG. 1). The second DC voltage V2 may be output from the output unit 21 to second power supply lines L2. The output unit 21 may have a first output terminal 21A and a second output terminal 21B. Preferably, each of the first and second output terminals 21A and 21B includes, for example a screw terminal or a quick connection terminal. The output unit 21 may allow the second power supply lines L2 to be electrically connected to, and be configured to output the second DC voltage V2 to the second power supply lines L2. The second power supply lines L2 may be composed of two electric wires. An end of one of the two electric wires may be electrically connected to the first output terminal 21A, while an end of the other may be electrically connected to the second output terminal 21B.

Figure 2A:
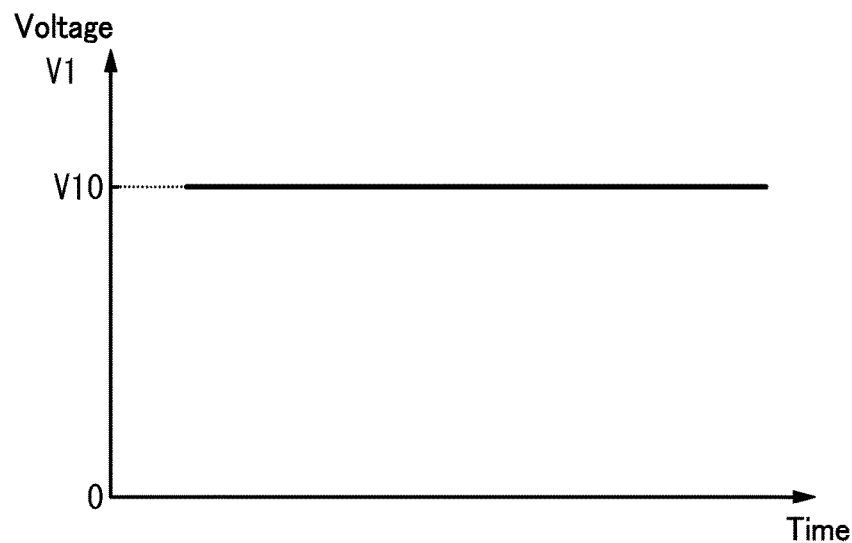
FIG. 2A is a waveform chart of a first DC voltage that is input to a signal transmitting device in the lighting system.

The voltage converter circuit 22 is preferably composed of, for example a variable-voltage type of three-terminal regulator configured to output a variable output voltage. That is, the voltage converter circuit 22 may be controlled by the control circuit 23 to alternatively switch the second DC voltage V2 (a voltage level thereof) to a first voltage level V21 or a second voltage level V22 (see FIG. 2B). Preferably, the first voltage level V21 equals a rated value of the second DC voltage V2. Note that the first voltage level V21 may be the same as or different from a rated voltage value V10 of the first DC voltage V1 (see FIG. 2A). The second voltage level V22 may be greater than or equal to a voltage value Vf necessary for causing the lighting device 1 to light a light source 5. Note that the voltage converter circuit 22 may be composed of a switching regulator in place of the variable-voltage type of three-terminal regulator. The variable-voltage type of three-terminal regulator can only decrease the input voltage, but the switching regulator can decrease, increase or increase/decrease the input voltage. It is accordingly preferable that the voltage converter circuit 22 be composed of a step-up type of switching regulator in case the second DC voltage V2 (the voltage level thereof) is increased than the first DC voltage V1 (a voltage level thereof).

Configuration examples of the control circuit 23 preferably include a microcontroller, a control IC and the like. The control circuit 23 may be configured to receive a control signal to be transmitted through a signal cable L3 from a remote controller 9. The control circuit 23 may further be configured to convert a dimming level instructed by the received control signal into transmission data to control the voltage converter circuit 22 according to the transmission data. Note that the dimming level may be defined as a value, a unit of which is [%], obtained by representing a ratio of a current flowing through the light source 5 to the rated value as percentage. The transmission data are composed of, for example an 8-bit string, values of which correspond one-to-one to 256 dimming levels. For example, a dimming level of 100[%] corresponds to (is converted into) a bit string value of "00000000", and a dimming level of 0[%] (unlit) corresponds to (is converted into) a bit string value of "11111111". In this example, a dimming level of 50[%] corresponds to (is converted into) a bit string value of "10000000". Note that the control circuit 23 in the embodiment is not limited to the 256 dimming levels but may operate based on 128 or 512 dimming levels, or several to ten-odd dimming levels.

Figure 2B:
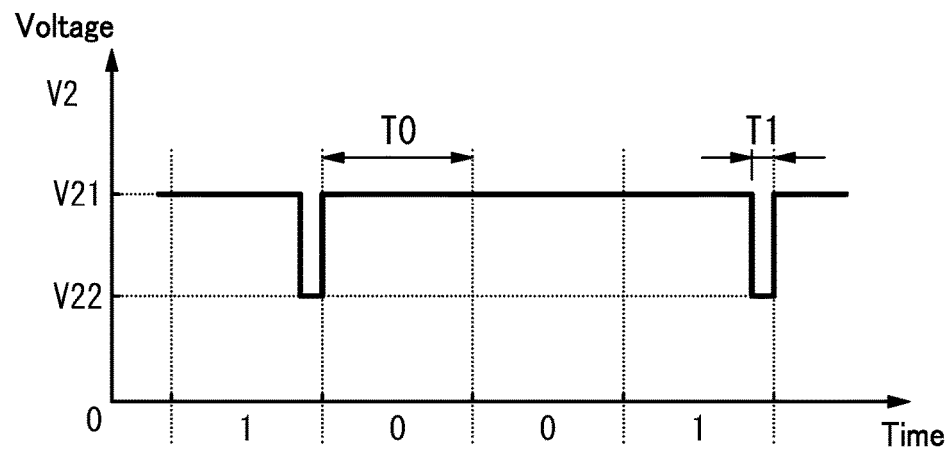
FIG. 2B is a waveform chart of a transmission signal transmitted from the signal transmitting device in the lighting system.

For example, when a value of a bit in the transmission data (a bit value) is "1", the control circuit 23 may control the voltage converter circuit 22 to change the second DC voltage V2 (a voltage level thereof) to the second voltage level V22 lower than the first voltage level V21 (see FIG. 2B). On the other hand, when a bit value in the transmission data is "0", the control circuit 23 may control the voltage converter circuit 22 to change the second DC voltage V2 (a voltage level thereof) to the first voltage level V21 (see FIG. 2B). Specifically, the control circuit 23 may form a transmission time period, during which the transmission data of 8 bits are transmitted, from 8 time slots each of which has a constant time period T0 (see FIG. 2B). When a bit value in the transmission data is "1", the control circuit 23 may control the voltage converter circuit 22 to change the second DC voltage V2 (a voltage level thereof) to the second voltage level V22 during a time period T1 shorter than the time slot of the time period T0 (see FIG. 2B). Note that the control circuit 23 may control the voltage converter circuit 22 so that a rising edge of the second DC voltage V2 (the rising edge from the second voltage level V22 to the first voltage level V21) accords with an end point of a corresponding time slot. Note that the control circuit 23 may change the second DC voltage V2 (the voltage level thereof) to the second voltage level V22 during an arbitrary time period in the time slot. For example, the control circuit 23 may control the voltage converter circuit 22 so that a falling edge of the second DC voltage V2 (the falling edge from the first voltage level V21 to the second voltage level V22) accords with a start point of a corresponding time slot. In short, in the embodiment, the control circuit 23 is configured to obtain transmission data from an external control signal and then control the voltage converter circuit 22 to change the second DC voltage V2 (a voltage level thereof) to the first voltage level V21 or the second voltage level V22 when each of the bit values of the transmission data is a first value (e.g., "0") or a second value ("e.g., "1", respectively. Preferably, when changing the second DC voltage V2 (a voltage level thereof) to the second voltage level V22, the control circuit 23 changes it to the second voltage level V22 during a period of time that is equal to or shorter than each time slot of the bit values.

Herein, the control circuit 23 may control the voltage converter circuit 22 so that a start bit that represents the start of the transmission time period is transmitted before a first bit of the transmission data and a stop bit that represents the end of the transmission time period is transmitted after a last bit of the transmission data. For example, the start bit is a bit string such as "111", and the stop bit is a bit string such as "000". Note that if the transmission data have a fixed length of 8 bits, the stop bit is not necessarily transmitted from the signal transmitting device 2 because the signal receiving device 3 can recognize the end of the transmission time period. Note that the transmission signal in the embodiment is a signal to be transmitted by switching a voltage across the second power supply lines L2 (the second DC voltage V2) to the first voltage level V21 or the second voltage level V22 during the transmission time period. That is, the transmission signal contains the start bit, the transmission data and the stop bit, but may exclude the stop bit as needed. The control circuit 23 may control the voltage converter circuit 22 with the second DC voltage V2 (the voltage level thereof) kept at the first voltage level V21 during a time period different from the transmission time period (a time period other than the transmission time period).

As will be appreciated, the control circuit 23 may include logic circuity and/or a microcontroller and a memory which stores a machine readable program that, when executed by the microcontroller, carries out the functions described herein.

Figure 3:
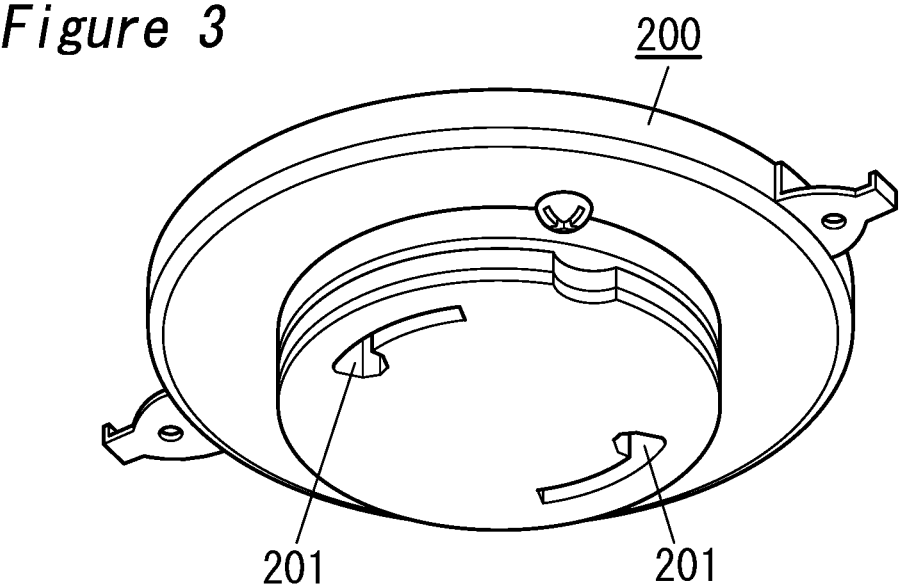
FIG. 3 is a perspective view of a lighting device and a ceiling rose in the lighting system.
Figure 3:
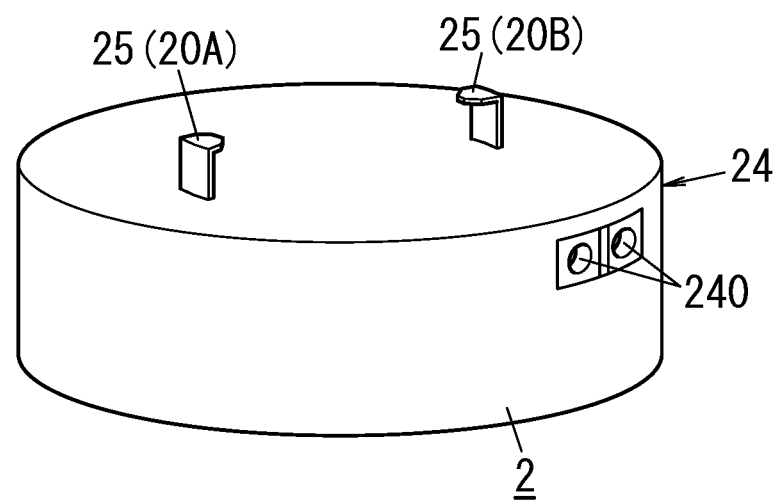

Incidentally, the first power supply lines L1 may be electrically connected to a wiring accessory for power supply. The wiring accessory for power supply is, for example a ceiling rose 200 configured to be installed on a ceiling of a dwelling (ceiling finishing material) (see FIG. 3). The ceiling rose 200 is electrically connected to the first power supply lines L1 that are wired in the attic or the like in advance, and supplied with DC power from the DC power supply 8 via the first power supply lines L1. As shown in FIG. 3, the signal transmitting device 2 may have a cylindrical housing 24. Preferably, the housing 24 is formed of electrically non-conductive material such as, for example, synthetic resin. The housing 24 may have two hook blades 25 protruding from an upper surface thereof. The two hook blades 25 are engaged with hook blade receptacles 201 of the ceiling rose 200, and thereby the signal transmitting device 2 is electrically and mechanically connected to ceiling rose 200. In this case, the two hook blades 25 correspond to the input unit 20 (the first and second input terminals 20A and 20B thereof). The housing 24 may have two built-in quick connection terminals that allow the first and second output terminals 21A and 21B of the output unit 21 in the signal transmitting device 2 to be electrically connected to the second power supply lines L2 therethrough. The housing 24 may be provided with wire insertion holes 240 that are provided in a circumference surface of the housing 24 and that allow electric wires to be electrically connected to the two quick connection terminals therethrough.

Figure 5:
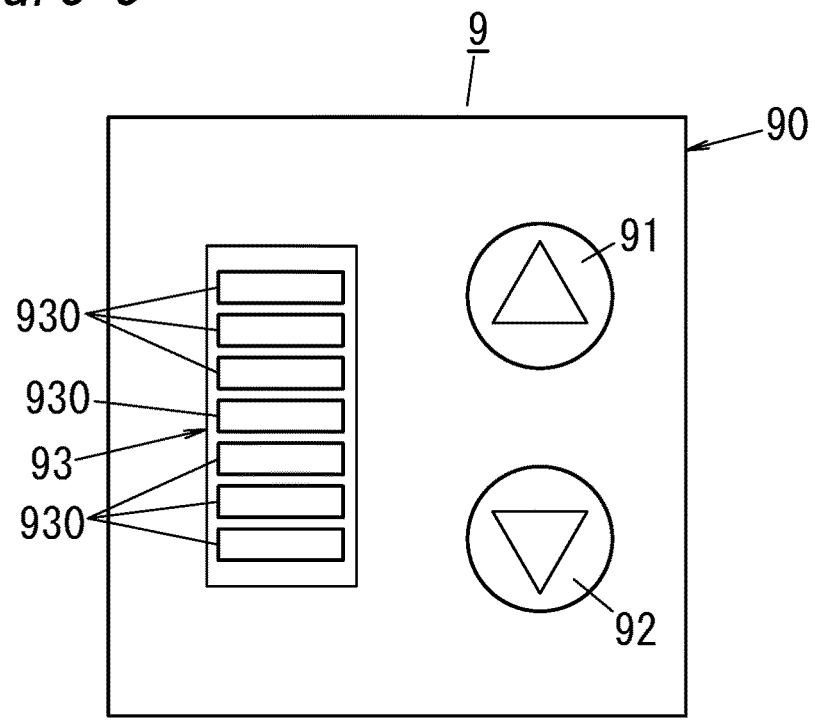
FIG. 5 is a front view of a remote controller that is provided along with the lighting system.

As shown in FIG. 5, the remote controller 9 may include a body 90 composed of synthetic resin molding. For example, the body 90 is installed in a wall with part thereof (mainly back part) recessed in a hole cut in a wall member. The remote controller 9 may include a first operation button 91, a second operation button 92 and a display 93. The first operation button 91 may be exposed on a front surface of the body 90. The second operation button 92 may be exposed beneath the first operation button 91 on the front surface of the body 90. For example, the display 93 may have seven display elements (light emitting diodes or the like) 930 that are aligned vertically. The display 93 may be configured to light zero or more display elements 930 of the seven display elements 930 according to a dimming level that is set by pushing the first and second operation buttons 91 and 92.

Preferably, according to a push operation of the first operation button 91, the remote controller 9 increases the dimming level from a level immediately before the push operation to transmit a dimming signal that represents the increased dimming level via the signal cable L3. According to a push operation of the second operation button 92, the remote controller 9 may decrease the dimming level from a level immediately before the push operation to transmit a dimming signal that represents the decreased dimming level via the signal cable L3. The remote controller 9 may light the top display element 930 when the dimming level is 100[%], and light a lower display element 930 as the dimming level is decreased. The operator operating the remote controller 9 can approximately recognize the dimming level by the position of the lit display element 930 in the display 93. Such a device for controlling a dimming level of an illumination fixture as the abovementioned remote controller 9 is called a dimmer.

Returning to FIG. 1, the lighting device 1 preferably includes a lighting device input unit 10, a lighting device output unit 11 and a constant current circuit 12. The lighting device input unit 10 may have a first input terminal 10A and a second input terminal 10B. Preferably, each of the first and second input terminals 10A and 10B includes, for example a screw terminal or a quick connection terminal. The lighting device input unit 10 may allow the second power supply lines L2 to be electrically connected to, and be configured to be supplied with the second DC voltage V2 via the second power supply lines L2. The first input terminal 10A may be electrically connected to an electric wire, electrically connected to the first output terminal 21A of the signal transmitting device 2, of two electric wires constituting the second power supply lines L2. The second input terminal 10B may be electrically connected to an electric wire, electrically connected to the second output terminal 21B of the signal transmitting device 2, of two electric wires constituting the second power supply lines L2.

Preferably, the lighting device output unit 11 has a first output terminal 11A and a second output terminal 11B. Preferably, each of the first and second output terminals 11A and 11B includes, for example a screw terminal or a quick connection terminal. The lighting device output unit 11 may be electrically connected to the light source 5. The light source 5 has, for example one or more LED modules. For example, the LED module has a mount substrate, one or more LED chips mounted on a surface of the mount substrate, and a sealing member for sealing the one or more LED chips. The sealing member may be composed of sealing material having translucency such as silicone resin. Note that the LED chip may be a blue LED chip configured to emit blue light and the sealing member may be mixed with phosphor for wavelength-converting the blue light into yellow light. That is, the LED module may be configured to emit white light obtained by mixing the blue light and the yellow light. Note that the light source 5 is not limited to the LED module(s) but may be composed of an LED tube lamp or organic electroluminescent element(s).

Preferably, the first output terminal 11A is electrically connected a positive electrode of the light source 5 (e.g., an anode electrode of the LED module), while the second output terminal 11B is electrically connected to a negative electrode of the light source 5 (e.g., a cathode electrode of the LED module). The constant current circuit 12 may include a DC/DC converter such as a switching regulator or a series regulator. For example, when a rated voltage value of the second DC voltage V2 to be input to the lighting device input unit 10 from the signal transmitting device 2 (the first voltage level V21) is higher than a rated voltage of the light source 5, the constant current circuit 12 preferably includes a step-down chopper circuit. When the first voltage level V21 is lower than the rated voltage of the light source 5, the constant current circuit 12 preferably includes a step-up chopper circuit. In the present embodiment, the constant current circuit 12 includes the step-down chopper circuit to decrease the rated voltage value of the second DC voltage V2 yet remain higher than the rated voltage of the light source 5.

Figure 4:
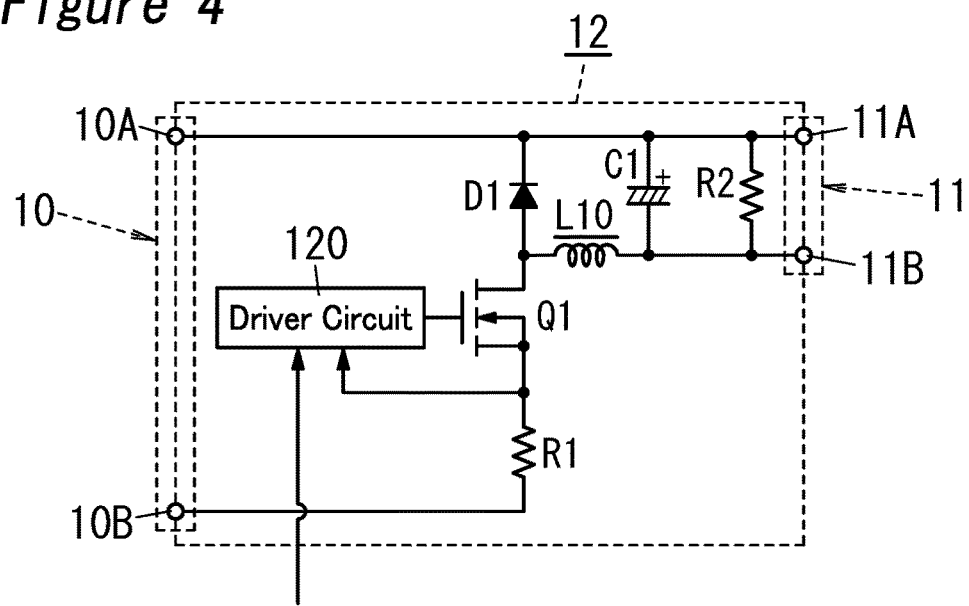
FIG. 4 is a circuit diagram of a constant current circuit in the lighting device of the lighting system.

As shown in FIG. 4, the constant current circuit 12 preferably includes a step-down chopper circuit and a driver circuit 120 configured to drive the step-down chopper circuit. A cathode of a diode D1 in the step-down chopper circuit may be electrically connected to the first input terminal 10A. A series circuit of a switching device Q1 and a resistor R1 in the step-down chopper circuit may be between an anode of the diode D1 and the second input terminal 10B. A smoothing capacitor C1 such as an electrolytic capacitor and an inductor L10 may be electrically connected in series between the cathode and anode of the diode D1. A discharge resistor R2 may be electrically connected between both ends of the smoothing capacitor C1. The light source 5 may be electrically connected between the first and second output terminals 11A and 11B of the lighting device output unit 11. The driver circuit 120 may be configured to perform high frequency switching of the switching device Q1. Specifically, the driver circuit 120 may detect (measure) a value of a current flowing through the switching device Q1 based on a voltage across the resistor R1 to turn the switching device Q1 off when the value of the current reaches a target value. The driver circuit 120 may turn the switching device Q1 on after a constant cycle or when no current flows through the inductor L10. The driver circuit 120 can cause the value of the current flowing through the light source 5 to accord with the target value by switching the switching device Q1 as stated above. Note that the constant current circuit 12 preferably changes the target value, thereby increasing or decreasing an output current to turn off, on (at a rated power) and dim the light source 5.

Returning to FIG. 1, the signal receiving device 3 preferably includes a receiver input unit 30, a receiver circuit 31 and a voltage divider circuit. The receiver input unit 30 may have two receiver input terminals 30A and 30B. Preferably, each of the receiver input terminals 30A and 30B includes, for example a screw terminal or a quick connection terminal. Note that the receiver input terminals 30A and 30B of the receiver input unit 30 may be electrically connected in parallel with the first and second input terminals 10A and 10B of the lighting device input unit 10 inside the lighting device 1. Moreover, a single printed circuit board may be provided with a print circuit constituting the constant current circuit 12 of the lighting device 1, and a print circuit constituting the voltage divider circuit and the receiver circuit 31 of the signal receiving device 3. The receiver input unit 30 may be electrically connected to the second power supply lines L2 to be supplied with the second DC voltage V2 via the second power supply lines L2. The receiver input terminal 30A may be electrically connected to the first output terminal 21A of the signal transmitting device 2 via one of the two electric wires constituting the second power supply lines L2. The receiver input terminal 30B may be electrically connected to the second output terminal 21B of the signal transmitting device 2 via the other of the two electric wires constituting the second power supply lines L2.

As shown in FIG. 1, the voltage divider circuit is preferably composed of a series circuit of two resistors 32A and 32B. The voltage divider circuit may be electrically connected between the two receiver input terminals 30A and 30B to supply the receiver circuit 31 with a voltage (a detection voltage Vx) obtained by dividing a voltage (the second DC voltage V2) across the second power supply lines L2. Configuration examples of the receiver circuit 31 include a microcontroller, a control IC and the like. The receiver circuit 31 may sample the detection voltage Vx from the voltage divider circuit at a constant sampling period to store a sampled value in a buffer memory. Note that preferably the sampling period is shorter than the time period T1 during which the signal transmitting device 2 transmits one bit signal of the transmission data.

Preferably, the receiver circuit 31 is configured to sequentially compare the sampled value stored in the buffer memory (a voltage value of the detection voltage Vx) with a threshold Vth, thereby receiving the transmission signal (the start bit, the transmission data and the stop bit). That is, the receiver circuit 31 may judge that a bit value of "1" is received when the sampled value is less than the threshold Vth, and then store the received bit value ("1") in the buffer memory. When receiving the start bit, the receiver circuit 31 may receive a transmission bit transmitted subsequently to the start bit to store the transmission bit in the buffer memory. When receiving the stop bit, the receiver circuit 31 may stop storing data in the buffer memory. As stated above, the receiver circuit 31 in the embodiment may compare the detection voltage Vx (the voltage level thereof), which is proportional to (or a divided value of) the second DC voltage V2 (the voltage level thereof), with the threshold Vth, thereby indirectly comparing the second DC voltage V2 (the voltage level thereof) with the threshold Vth. Note that the receiver circuit 31 may directly compare the second DC voltage V2 (the voltage level thereof) with the threshold.

Preferably, the receiver circuit 31 acquires a dimming level from the transmission data stored in the buffer memory. The receiver circuit 31 may then convert the acquired dimming level into a PWM signal to supply the PWM signal to the constant current circuit 12 of the lighting device 1. The receiver circuit 31 may change a duty ratio of square wave having a constant cycle according to the dimming level, thereby converting the dimming level into the PWM signal. For example, the receiver circuit 31 may set the duty ratio to 100[%] when the dimming level is 100[%], set the duty ratio to 0[%] when the dimming level is 0[%], and set the duty ratio to 50[%] when the dimming level is 50[%]. Alternatively, the receiver circuit 31 may convert the dimming level into a voltage signal that represents a voltage value.

On the other hand, the constant current circuit 12 may change the target value of the output current according to the PWM signal from the receiver circuit 31. That is, when the duty ratio of the PWM signal is 100[%], the constant current circuit 12 may set the target value of the output current to a rated value (a current value of a rated current of the light source 5). When the duty ratio of the PWM signal is 50[%], the constant current circuit 12 may set the target value of the output current to a half value of the rated value. Note that when the duty ratio of the PWM signal is 0[%], the constant current circuit 12 may stop supplying the output current to turn the light source 5 off.

As will be appreciated, the receiver circuit 31 may include logic circuity and/or a microcontroller and a memory which stores a machine readable program that, when executed by the microcontroller, carries out the functions described herein.

Figure 6:
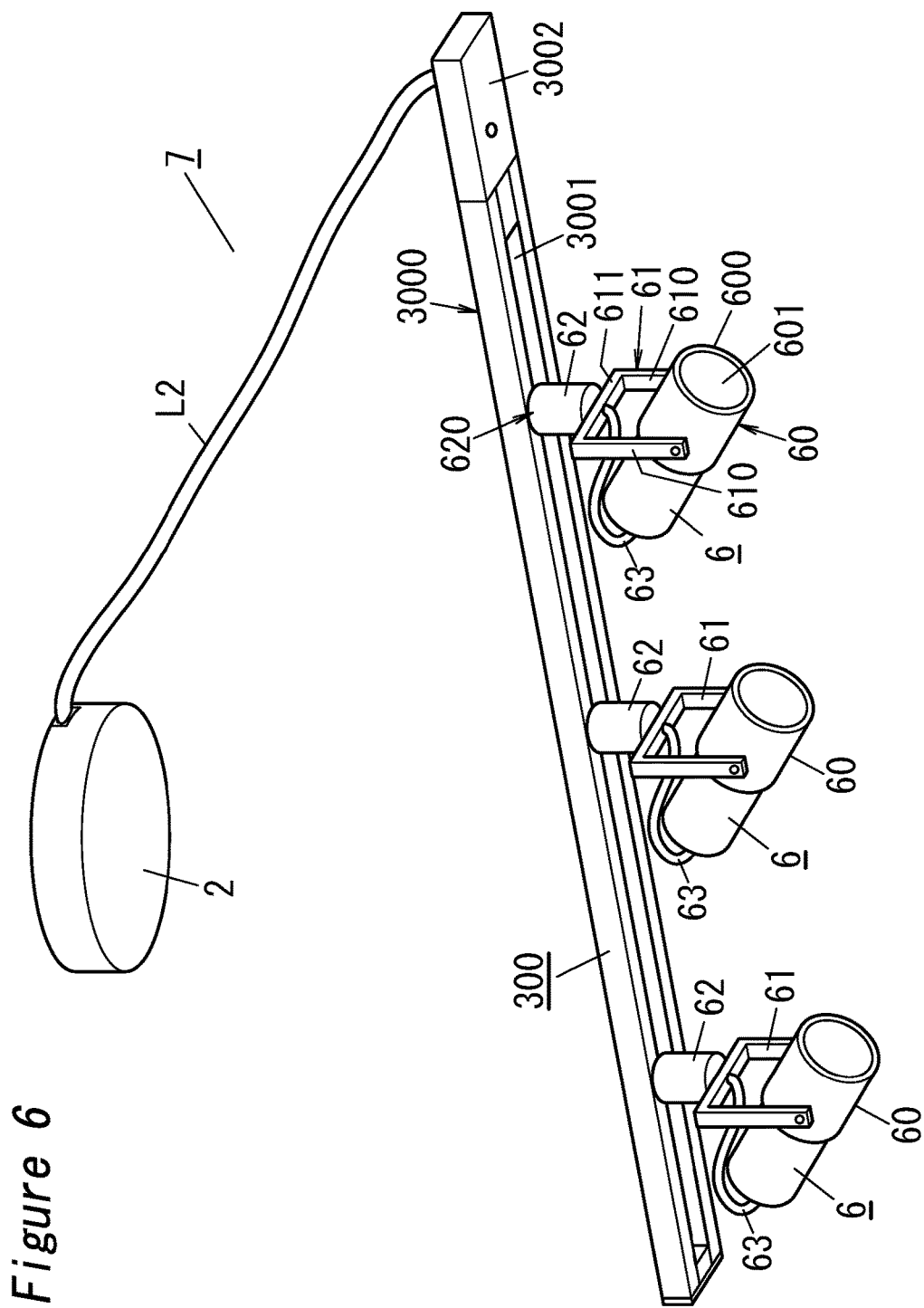
FIG. 6 is a system configuration diagram of the illumination system.

A component of the illumination fixture 6 may contain the lighting device 1, the signal receiving device 3 and the light source 5. In the example of FIG. 6, the illumination fixture 6 is a spotlight to be combined with a lighting duct for light fixtures (hereinafter simply called a duct) 300. The duct 300 may be attached on a ceiling (a lower surface of the ceiling finishing material). The duct 300 may have a duct body 3000 made from synthetic resin, and two conductors (not shown) housed in the duct body 3000. The duct body 3000 may be shaped like a hollow rectangular cuboid. The duct body 3000 may be provided with an insertion-hole 3001 formed in a lower surface thereof lengthwise. The two conductors may be fixed in the duct body 3000 with the insertion-hole 3001 sandwiched therebetween as seen from below. A feed-in unit 3002 may be electrically and mechanically connected to an end, in a lengthwise direction, of the duct body 3000. The feed-in unit 3002 may be configured to electrically connect the two electric wires of the second power supply lines L2 to the two conductors in the duct body 3000. That is, the duct 300 may be supplied with the second DC voltage V2 from the signal transmitting device 2.

As shown in FIG. 6, the illumination fixture 6 preferably includes a body 60, an arm 61, a plug 62 and the like. The body 60 may be made of metal or synthetic resin and shaped such that two cylinders having different diameters are coaxially connected to each other. The light source 5, the lighting device 1 and the signal receiving device 3 may be housed in the body 60. Note that a single printed circuit board may be provided with the print circuit constituting the constant current circuit 12 of the lighting device 1, and the print circuit constituting the voltage divider circuit and the receiver circuit 31 of the signal receiving device 3. The body 60 may have a window hole 600 in one end thereof facing the light source 5. The window hole 600 may be covered with a panel 601 formed from translucency material such as glass or acrylic resin. The light emitted from the light source 5 is to be radiated toward an illumination space via the panel 601. The plug 62 may include a cylindrical plug body 620 and two electrode plates (not shown) protruding from an upper surface of the plug body 620. The two electrode plates may be inserted into the duct body 3000 from the insertion-hole 301 and in contact with the two conductors fixed in the duct body 3000. Note that the two electrode plates of the plug 62 may be electrically connected to the first and second input terminals 10A and 10B of the lighting device 1 housed in the body 60. The arm 61 may have two support pieces 610 that support the body 60, and a holding piece 611 that holds the two support pieces 610. A center part of the holding piece 611 may be supported by a lower surface side of the plug body 620 so that the arm 61 is free to rotate around the center part of the holding piece 611 along a horizontal plane. Both sides of the body 60 may be supported by both ends of the two support pieces 610 of the arm 61 so that the body 60 is free to rotate around both the ends of the two support pieces 610 along a vertical plane.

In the example of FIG. 6, the illumination fixture 6 is electrically and mechanically connected to the duct 300 via the plug 62. The illumination fixture 6 is to be lit by DC power from the second power supply lines L2 supplied through the duct 300. Note that the illumination system 7 may be composed of the signal transmitting device 2 and the illumination fixture 6 (the light source 5, the lighting device 1 and the signal receiving device 3) (see FIG. 1). As shown in FIG. 6, the illumination system 7 may be composed of the signal transmitting device 2 and the illumination fixtures 6.

An operation of the lighting system 4 and the illumination system 7 will be hereinafter explained.

In an example, an operator changes the dimming level from 100[%] to 50[%] by a push operation of the second operation button 92 of the remote controller 9. In this example, the remote controller 9 transmits a dimming signal for setting the dimming level to 50[%] via the signal cable L3. When receiving the dimming signal from the remote controller 9, the control circuit 23 of the signal transmitting device 2 converts the dimming level (50[%]) represented by the dimming signal into transmission data (an 8-bit string of "10000000"). The control circuit 23 controls the voltage converter circuit 22, transmits the transmission data subsequently to the start bit, and then transmits the stop bit.

The transmission signal transmitted via the second power supply lines L2 (including the conductors of the duct 300) from the signal transmitting device 2 is received by all the signal receiving devices 3 of the illumination fixtures 6. Each receiver circuit 31 of the signal receiving devices 3 acquires the dimming level (50[%]) from the transmission data contained in the received transmission signal to convert the dimming level into a PWM signal. That is, each receiver circuit 31 generates the PWM signal for setting the duty ratio to 50[%] to supply the generated PWM signal to a corresponding lighting device 1 (the constant current circuit 12 thereof).

The constant current circuit 12 sets the target values of the output current to a half value of the rated value according to a duty ratio (50[%]) of the PWM signal. The current value of the output current supplied from the lighting device output unit 11 of the lighting device 1 to a corresponding light source 5 accordingly becomes half of the rated value. As a result, light quantity from the light source 5 (luminous flux) also becomes about half of light quantity when it is lit at the rated value. That is, light quantity of every illumination fixture 6 connected to the duct 300 is decreased to half of the light quantity when it is lit at the rated value.

Here, the illumination system described in Document 1 is configured to superpose a communication signal (a transmission signal) for transmitting data on a DC voltage over high frequency carrier wave. Superposing the transmission signal obtained by modulating the high frequency carrier wave on the DC voltage as the illumination system described in Document 1 may cause electromagnetic radiation (noise) through indoor wiring functioning as an antenna or a leakage of a transmission signal (noise) into neighboring houses via power line. On the other hand, the lighting system 4 and the illumination system 7 can transmit transmission data (a dimming level) by changing the DC voltage, namely the second DC voltage V2 (a voltage level thereof) to be supplied via the second power supply lines L2. The lighting system 4 and the illumination system 7 can accordingly decrease the noise caused by the transmission and reception of the transmission data in comparison with the case where the transmission signal obtained by modulating the high frequency carrier wave is superposed on the DC voltage. It is moreover possible to simplify the circuit configuration because both of the signal transmitting device 2 and the signal receiving device 3 need not include an oscillator for producing the high frequency carrier wave.

Here, each signal receiving device 3 may be assigned a unique address. When each signal receiving device 3 is assigned a unique address, the control circuit 23 of the signal transmitting device 2 may transmit transmission data after transmitting an address bit representing an address subsequently to the start bit. Each receiver circuit 31 of the signal receiving devices 3 may be configured to, if an address bit of a transmission signal received thereby accords with its own address, convert a dimming level acquired from the transmission data into a PWM signal to supply the PWM signal to a corresponding lighting device 1. If the address bit differs from the address, the receiver circuit 31 may discard the transmission data without acquiring the dimming level therefrom. Thus, as a result of each signal receiving device 3 being assigned a unique address, it is possible to individually turn on, off or dim the illumination fixtures 6 connected to the duct 300.

Returning to FIG. 1, as a length of the second power supply lines L2 (wiring length) increases, the second DC voltage V2 which is input to the receiver input unit 30 of the signal receiving device 3 decreases owing to a voltage drop by electric resistance of the second power supply lines L2 from the signal transmitting device 2 to the signal receiving device 3. The voltage drop due to the electric resistance of the second power supply lines L2 is increased in proportion to an amount of a current flowing through the second power supply lines L2 (the amount of current being a function of the dimming level). Therefore, when the threshold Vth of the receiver circuit 31 is fixed, the susceptibility to noise of the transmission signal may be increased because a difference between the first voltage level V21 and the threshold Vth (a margin) may decrease by the voltage drop by the electric resistance of the second power supply lines L2. Therefore, the receiver circuit 31 is preferably configured to calculate the threshold Vth from a voltage value of the second DC voltage V2 that is input to the receiver input unit 30 (in the embodiment, a voltage value of the detection voltage Vx) when a prescribed condition is satisfied. For example, the voltage value of the second DC voltage V2 may be an instantaneous voltage value of the second DC voltage V2 but preferably a moving average of voltage values of the second DC voltage V2. Note that the receiver circuit 31 is preferably composed of a microcontroller.

In an example, the condition that allows the receiver circuit 31 to calculate the threshold Vth is the receiver circuit 31 being activated when the DC power supply 8 starts outputting a DC voltage according to activation of the utility grid AC (hereinafter referred to as a first condition). Another condition is, for example the receiver circuit 31 receiving a transmission signal (hereinafter referred to as a second condition).

Figure 7:
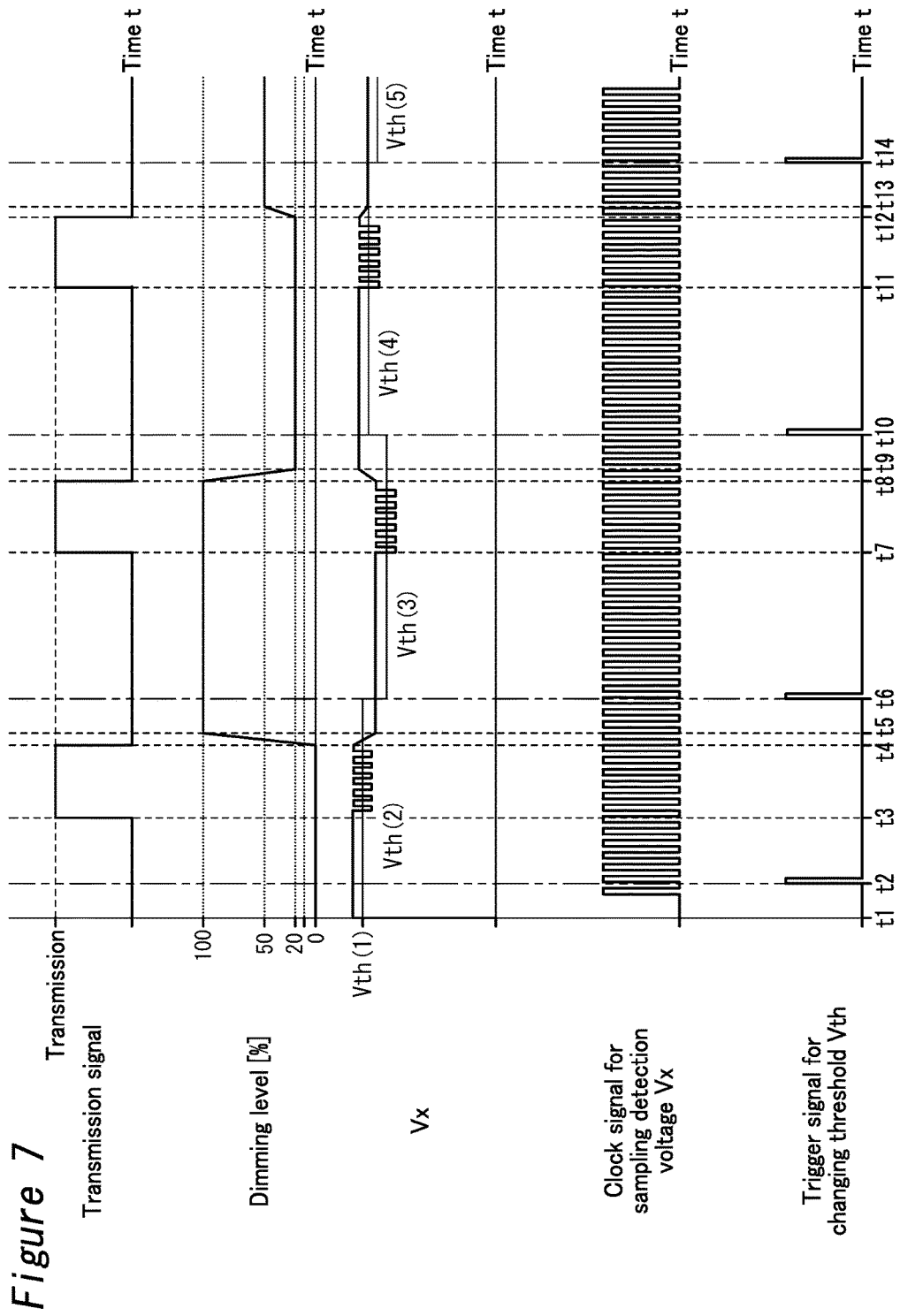
FIG. 7 is a time chart illustrating an operation of the signal receiving device.

Operations of the receiver circuit 31 when the first and second conditions are satisfied will be explained with reference to the time chart in FIG. 7. In FIG. 7, each horizontal axis depicts a time t. In FIG. 7, a first (top) row depicts a transmission state of a transmission signal, a second row depicts a dimming level represented by transmission data of the transmission signal, and a third row depicts a detection voltage Vx obtained by dividing the second DC voltage V2. In FIG. 7, a fourth row depicts a clock signal that allows the receiver circuit 31 to sample the detection voltage Vx, and a fifth (bottom) row depicts a trigger signal for determining a timing that allows the receiver circuit 31 to change the threshold Vth. Note that the clock signal and the trigger signal may be produced in the receiver circuit 31.

When the DC power supply 8 starts supplying a DC voltage according to the activation of the utility grid AC, the voltage converter circuit 22 and the control circuit 23 of the signal transmitting device 2 are activated and a second DC voltage V2 is applied across the second power supply lines L2. When the second DC voltage V2 is applied across the second power supply lines L2, the receiver circuit 31 of the signal receiving device 3 is activated (time t=t1). The receiver circuit 31 supplies the constant current circuit 12 of the lighting device 1 with a PWM signal corresponding to a dimming level of 0[%] from when it is activated to when receiving a first transmission signal. The light source 5 is accordingly unlit.

Preferably, the receiver circuit 31 starts outputting the clock signal immediately after it is activated, and then sequentially samples a detection voltage Vx to store a sampled value (a voltage value of the detection voltage Vx) in the buffer memory. Here, the activated receiver circuit 31 judges that the first condition is satisfied. The receiver circuit 31 calculates a moving average (a simple moving average) of voltage values of the detection voltage Vx stored in the buffer memory to calculate a new threshold Vth(2) by subtracting a prescribed change value from the calculated moving average. Note that when the voltage converter circuit 22 of the signal transmitting device 2 includes a step-up switching regulator, the receiver circuit 31 may calculate a new threshold Vth(2) by adding the prescribed change value to the calculated moving average. The receiver circuit 31 outputs a trigger signal and changes the threshold Vth(1) stored in a built-in memory of the microcontroller to the newly calculated threshold Vth(2) (time t=t2). Note that the change value subtracted from the moving average may be a value corresponding to a prescribed percent of a voltage level of the second DC voltage V2 (e.g., 3 [V]), where the prescribed percent is, for example in a range from several to ten-odd percent, preferably in a range from 5 to 15 percent.

The control circuit 23 of the signal transmitting device 2 starts transmitting a transmission signal containing transmission data of a default dimming level (e.g., 100[%]) at a point in time when a prescribed time elapses after it is activated (time t=t3). The second DC voltage V2 (a voltage level thereof) to be input to the receiver input unit 30 of the signal receiving device 3 is switched to the first voltage level V21 or the second voltage level V22 according to the transmission signal. The receiver circuit 31 receives the transmission signal (time t=t3 to t4) by comparing the sampled value sequentially stored in the buffer memory with the threshold Vth(2) changed after it is activated. The receiver circuit 31 then acquires the dimming level (e.g., 100[%]) from the transmission data of the received transmission signal, and converts the acquired dimming level into a PWM signal to supply the PWM signal to the lighting device 1 (the constant current circuit 12 thereof). The lighting device 1 consequently causes a current of a rated value to flow through the light source 5, thereby turning on the light source 5 at the rated value (time t=t4 to t5).

If the light source 5 is lit at the rated value through the lighting device 1, the current flowing through the second power supply lines L2 increases. As a result, the voltage drop by the electric resistance of the second power supply lines L2 increases and therefore the second DC voltage V2 applied across the receiver input unit 30 decreases (time t=t5). The receiver circuit 31 receives the transmission signal, thereby judging that the second condition is satisfied. After receiving the transmission signal, specifically after supplying the lighting device 1 with the PWM signal corresponding to the dimming level acquired from the transmission signal, the receiver circuit 31 calculates a moving average of voltage values of the detection voltage Vx stored in the buffer memory. The receiver circuit 31 then calculates a new threshold Vth(3) by subtracting the change value from the calculated moving average. The receiver circuit 31 outputs a trigger signal and changes the threshold Vth(2) stored in the built-in memory of the microcontroller to the newly calculated threshold Vth(3) (time t=t6). Note that preferably a timing when the receiver circuit 31 calculates the threshold Vth(3) to change the threshold Vth(2) to the threshold Vth(3) is a point in time when a prescribed time elapses after the PWM signal is output, where the prescribed time is a time during which a current flowing through the second power supply lines L2 becomes stable.

When receiving a dimming signal from the remote controller 9, the control circuit 23 of the signal transmitting device 2 starts transmitting a transmission signal containing transmission data of a dimming level (e.g., 20[%]) represented by the dimming signal (time t=t7). The receiver circuit 31 receives the transmission signal (time t=t7 to t8) by comparing the sampled value sequentially stored in the buffer memory with the threshold Vth(3) changed after receiving the previous transmission signal (time t=t6). The receiver circuit 31 then acquires the dimming level (20[%]) from the transmission data of the received transmission signal and converts the acquired dimming level into a PWM signal to supply the PWM signal to the constant current circuit 12 of the lighting device 1. The lighting device 1 subsequently causes a current corresponding to about 20[%] of the rated value (the rated current) to flow through the light source 5, thereby dimming the light source 5 (time t=t8 to t9).

The lighting device 1 decreases the dimming level from 100[%] to 20[%] to light the light source 5 at the dimming level (a lower light output), and thereby the current flowing through the second power supply lines L2 decreases. As a result, the second DC voltage V2 applied across the receiver input unit 30 increases (time t=t9) because the voltage drop by the electric resistance of the second power supply lines L2 decreases. The receiver circuit 31 receives the transmission signal, thereby judging that the second condition is satisfied. After receiving the transmission signal, specifically after supplying the lighting device 1 with the PWM signal corresponding to the dimming level acquired from the transmission signal, the receiver circuit 31 calculates a moving average of voltage values of the detection voltage Vx stored in the buffer memory. The receiver circuit 31 then calculates a new threshold Vth(4) by adding the change value to the calculated moving average. The receiver circuit 31 outputs a trigger signal and changes the threshold Vth(3) stored in the built-in memory of the microcontroller to the newly calculated threshold Vth(4) (time t=t10).

When receiving a dimming signal from the remote controller 9, the control circuit 23 of the signal transmitting device 2 starts transmitting a transmission signal containing transmission data of a dimming level (e.g., 50[%]) represented by the dimming signal (time t=t11). The receiver circuit 31 receives the transmission signal (time t=t11 to t12) by comparing the sampled value sequentially stored in the buffer memory with the threshold Vth(4) changed after receiving the previous transmission signal (time t=t10). The receiver circuit 31 then acquires the dimming level (50[%]) from the transmission data of the received transmission signal and converts the acquired dimming level into a PWM signal to supply the PWM signal to the constant current circuit 12 of the lighting device 1. The lighting device 1 subsequently causes a current corresponding to about 50[%]

of the rated value (the rated current) to flow through the light source 5, thereby dimming the light source 5 (time t=t12 to t13).

The lighting device 1 increases the dimming level from 20[%] to 50[%] to light the light source 5 at the dimming level (a higher light output), and thereby the current flowing through the second power supply lines L2 increases. As a result, the second DC voltage V2 applied across the receiver input unit 30 decreases (time t=t13) because the voltage drop by the electric resistance of the second power supply lines L2 increases. The receiver circuit 31 receives the transmission signal, thereby judging that the second condition is satisfied. After receiving the transmission signal, specifically after supplying the lighting device 1 with the PWM signal corresponding to the dimming level acquired from the transmission signal, the receiver circuit 31 calculates a moving average of voltage values of the detection voltage Vx stored in the buffer memory. The receiver circuit 31 then calculates a new threshold Vth(5) by subtracting the change value from the calculated moving average. The receiver circuit 31 outputs a trigger signal and changes the threshold Vth(4) stored in the built-in memory of the microcontroller to the newly calculated threshold Vth(5) (time t=t14).

Note that the condition that allows the receiver circuit 31 to calculate the threshold Vth is not limited to the above-mentioned first and second conditions. For example, the condition that allows the receiver circuit 31 to calculate the threshold Vth may be a difference between the second DC voltage V2 (a voltage level thereof) and the threshold Vth being out of a prescribed range (hereinafter called a third condition).

Figure 8:
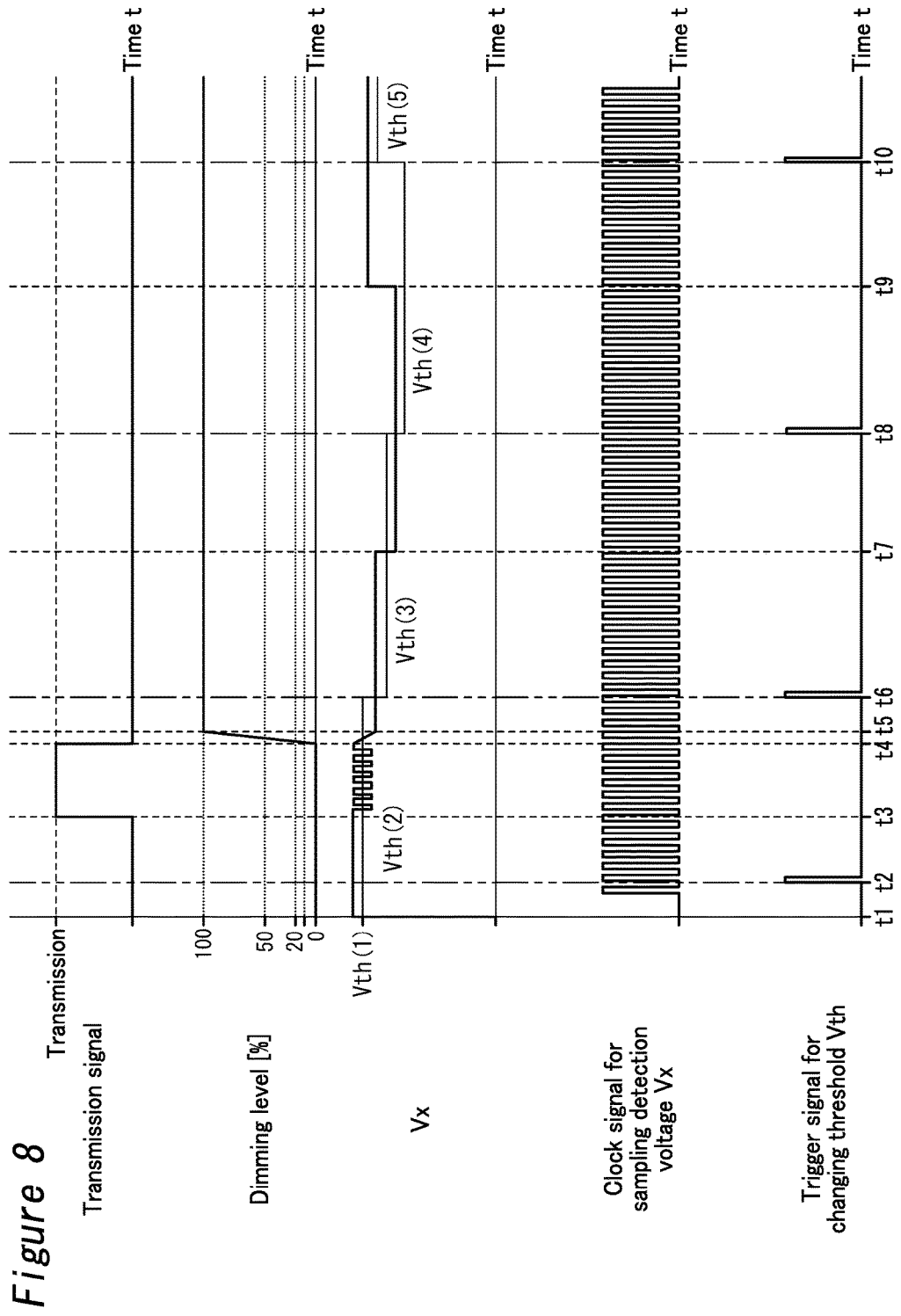
FIG. 8 is a time chart illustrating another operation of the signal receiving device.

Operations of the receiver circuit 31 when the first to third conditions are satisfied will be explained with reference to the time chart in FIG. 8. In FIG. 8, each horizontal axis depicts a time t. In FIG. 8, a first (top) row depicts a transmission state of a transmission signal, a second row depicts a dimming level represented by transmission data of the transmission signal, and a third row depicts a detection voltage Vx. In FIG. 8, a fourth row depicts a clock signal that allows the receiver circuit 31 to sample the detection voltage Vx, and a fifth (bottom) row depicts a trigger signal for determining a timing that allows the receiver circuit 31 to change the threshold Vth.

When the DC power supply 8 starts supplying a DC voltage according to the activation of the utility grid AC, the voltage converter circuit 22 and the control circuit 23 of the signal transmitting device 2 are activated and a second DC voltage V2 is applied across the second power supply lines L2. When the second DC voltage V2 is applied across the second power supply lines L2, the receiver circuit 31 of the signal receiving device 3 is activated (time t=t1). The receiver circuit 31 starts outputting the clock signal immediately after it is activated, and then sequentially samples a detection voltage Vx to store a sampled value (a voltage value of the detection voltage Vx) in the buffer memory. The activated receiver circuit 31 judges that the first condition is satisfied. The receiver circuit 31 calculates a moving average of voltage values of the detection voltage Vx stored in the buffer memory to calculate a new threshold Vth(2) by subtracting the change value from the calculated moving average. The receiver circuit 31 outputs a trigger signal and changes the threshold Vth(1) stored in the built-in memory of the microcontroller to the newly calculated threshold Vth(2) (time t=t2).

On the other hand, the control circuit 23 of the signal transmitting device 2 starts transmitting a transmission signal containing transmission data of a default dimming level (e.g., 100[%]) at a point in time when a prescribed time elapses after it is activated (time t=t3). The second DC voltage V2 (a voltage level thereof) to be input to the receiver input unit 30 of the signal receiving device 3 is switched to the first voltage level V21 or the second voltage level V22 according to the transmission signal. The receiver circuit 31 receives the transmission signal (time t=t3 to t4) by comparing the sampled value sequentially stored in the buffer memory with the threshold Vth(2) changed after it is activated. The receiver circuit 31 then acquires the dimming level (e.g., 100[%]) from the transmission data of the received transmission signal, and converts the acquired dimming level into a PWM signal to supply the PWM signal to the lighting device 1 (the constant current circuit 12 thereof). The lighting device 1 consequently causes the current of the rated value (the rated current) to flow through the light source 5, thereby turning on the light source 5 at the rated value (time t=t4 to t5).

If the light source 5 is lit at the rated value through the lighting device 1, the current flowing through the second power supply lines L2 increases. As a result, the voltage drop by the electric resistance of the second power supply lines L2 increases and therefore the second DC voltage V2 applied across the receiver input unit 30 decreases (time t=t5). The receiver circuit 31 receives the transmission signal, thereby judging that the second condition is satisfied. After receiving the transmission signal, specifically after supplying the lighting device 1 with the PWM signal corresponding to the dimming level acquired from the transmission signal, the receiver circuit 31 calculates a moving average of voltage values of the detection voltage Vx stored in the buffer memory. The receiver circuit 31 then calculates a new threshold Vth(3) by subtracting the change value from the calculated moving average. The receiver circuit 31 outputs a trigger signal and changes the threshold Vth(2) stored in the built-in memory of the microcontroller to the newly calculated threshold Vth(3) (time t=t6).

Here, with the illumination system 7, the current flowing through the second power supply lines L2 may increase or decrease other than when the lighting device 1 changes the dimming level of the light source 5. The current flowing through the second power supply lines L2 decreases, for example when a light source 5 is unlit owing to a failure of a corresponding illumination fixture 6 of the illumination fixtures 6 electrically connected to the second power supply lines L2. In addition, the current flowing through the second power supply lines L2 increases when the DC power supply 8 supplies power to a sensor device, equipped with a brightness sensor configured to detect (measure) ambient brightness, a motion detector configured to detect human presence in a detection area, or the like, through the second power supply lines L2. Note that the sensor device is preferably configured to transmit a transmission signal by changing the second DC voltage V2 (a voltage level thereof) like the signal transmitting device 2 when the brightness is below a reference value or when human presence is detected in the detection area. Preferably, the illumination fixture 6 is configured so that the signal receiving device 3 receives the transmission signal from the sensor device and the lighting device 1 turns on, off or dim the light source 5 according to the transmission data acquired from the transmission signal.

FIG. 8 shows an example in which a consumption current of the sensor device temporarily increases, and thereby the current flowing through the second power supply lines L2 increases. That is, if the current flowing through the second power supply lines L2 increases, the second DC voltage V2 applied across the receiver input unit 30 decreases, and sampled values of the detection voltage Vx (sample values of the detection voltage Vx of the first voltage level V21) are below the threshold (3) (time t=t7). The receiver circuit 31 judges that the third condition is satisfied when a first time period reaches a prescribed time period, where the first time period is a time period in which the sampled values of the detection voltage Vx are below the threshold Vth(3). Note that preferably the prescribed time period is sufficiently longer than the time period T0 of the time slot for the transmission signal. The receiver circuit 31 calculates a moving average of voltage values of the detection voltage Vx stored in the buffer memory. The receiver circuit 31 then calculates a new threshold Vth(4) by subtracting the change value from the calculated moving average. The receiver circuit 31 outputs a trigger signal and changes the threshold Vth(3) stored in the built-in memory of the microcontroller to the newly calculated threshold Vth(4) (time t=t8).

FIG. 8 shows another example in which a failure occurs in one illumination fixture 6 and thereby the current flowing through the second power supply lines L2 decreases. That is, if the current flowing through the second power supply lines L2 decreases, the second DC voltage V2 applied across the receiver input unit 30 increases, and a difference between each of sampled values of the detection voltage Vx and the threshold Vth(4) increases significantly (time t=t9). The receiver circuit 31 judges that the third condition is satisfied when a second time period reaches the prescribed time period, where the second time period is a time period in which respective differences obtained by subtracting the threshold Vth(4) from the sampled values of the detection voltage Vx (sampled values of the detection voltage Vx of the first voltage level V21) are greater than a prescribed value (e.g., the change value). The receiver circuit 31 calculates a moving average of voltage values of the detection voltage Vx stored in the buffer memory. The receiver circuit 31 then calculates a new threshold Vth(5) by subtracting the change value from the calculated moving average. The receiver circuit 31 outputs a trigger signal and changes the threshold Vth(4) stored in the built-in memory of the microcontroller to the newly calculated threshold Vth(5) (time t=t10).

As stated above, the receiver circuit 31 of the signal receiving device 3 calculates the threshold Vth(n) (n=1, 2, 3, . . . ) from voltage values of the detection voltage Vx (sampled values) proportional to the second DC voltage V2 when any of the first to third conditions is satisfied. The receiver circuit 31 then receives the transmission signal by comparing voltage values of the detection voltage Vx with the calculated threshold Vth(n). Here, each of the first to third conditions is a condition with a high possibility that the second DC voltage V2 (a voltage level thereof) to be input to the receiver input unit 30 increase or decrease. That is, when any of the first to third conditions is satisfied, respective difference between the first voltage levels V21 and the threshold Vth (margins) decrease and the susceptibility to noise of the transmission signal may increase. It is however possible to avoid the noise susceptibility of the transmission signal increasing when any of the first to third conditions is satisfied because the receiver circuit 31 calculates the threshold Vth from voltage values of the detection voltage Vx proportional to the second DC voltage V2 and thereby the threshold Vth is set in an appropriate range.

Here, when it is judged that the second condition is satisfied, the receiver circuit 31 may set, to the change value, a half value of a difference between a sampled value of the detection voltage Vx corresponding to the first voltage level V21 of the transmission signal and a sampled value of the detection voltage Vx corresponding to the second voltage level V22.

When the number of illumination fixtures 6 electrically connected to the second power supply lines L2 is greater than a specified number, the current flowing through the second power supply lines L2 may exceed a range assumed in the lighting system 4. The excessive current continuously flowing through the lighting system 4 may cause an increase in temperature of the second power supply lines L2 and the DC power supply 8. In this case, it is considered that the threshold Vth to be calculated by the receiver circuit 31 would be out of a prescribed allowable range. It is accordingly preferable that when the threshold Vth calculated by the receiver circuit 31 is out of the prescribed allowable range, the signal receiving device 3 supplies the constant current circuit 12 with a PWM signal having a duty ratio of 0[%] to cause the lighting device 1 to turn the light source 5 off.

Figure 9:
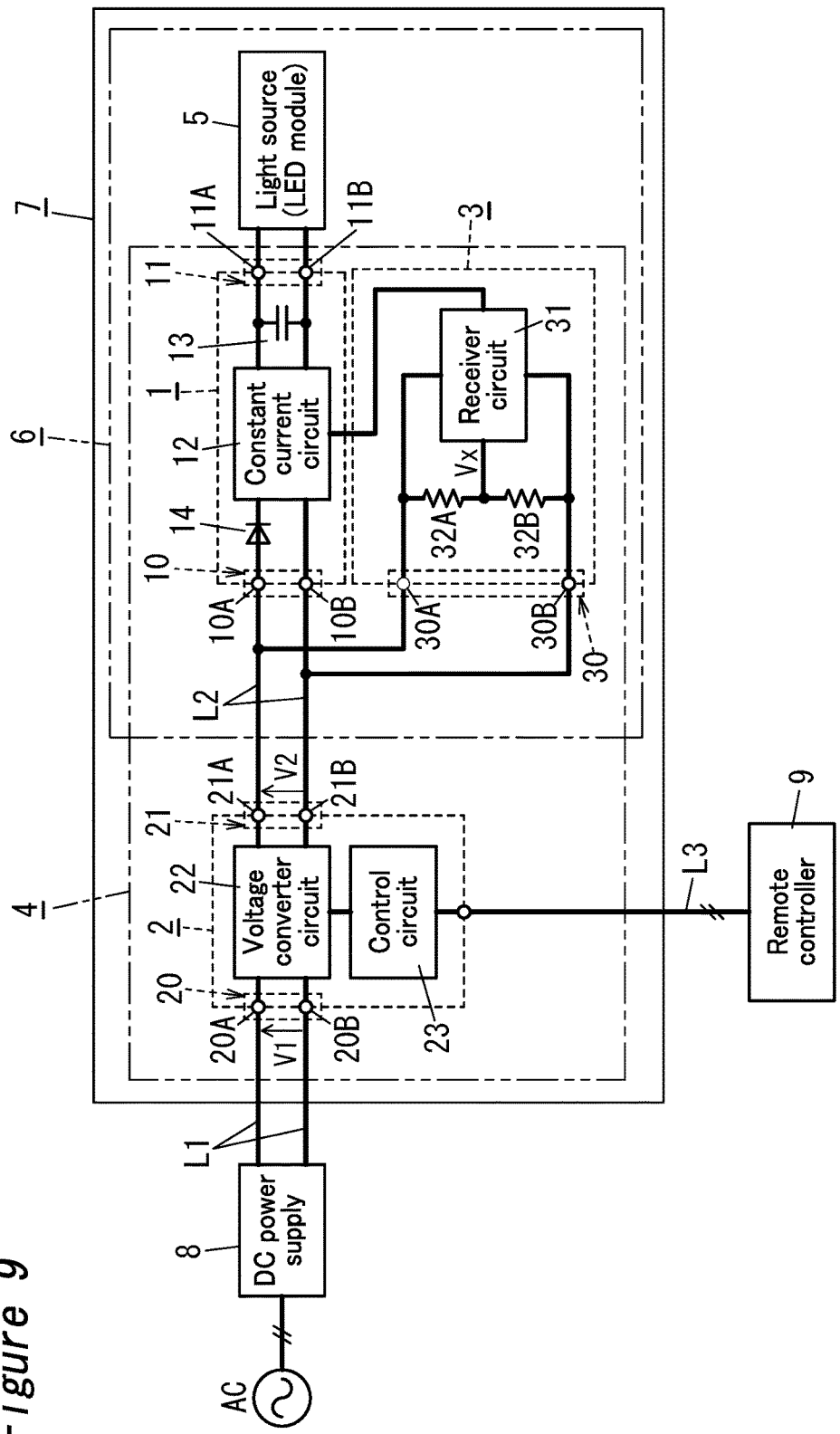
FIG. 9 is a block diagram of a modified example of the lighting system.

Preferably, a capacitor 13 is electrically connected in parallel with output ends of the constant current circuit 12 in the lighting device 1 and the lighting device output unit 11, when no smoothing capacitor is provided in an output stage of the constant current circuit 12 (see FIG. 9). As shown in FIG. 9, it is further preferable that a rectifier diode 14 be electrically connected between the first input terminal 10A of the lighting device input unit 10 and the constant current circuit 12. An anode of the diode 14 may be electrically connected to the first input terminal 10A, while a cathode of the diode 14 may be electrically connected to an input end on a high potential side of the constant current circuit 12. The capacitor 13 can suppress the variation in an output voltage (an output current) of the constant current circuit 12 for each transmission time period of transmission signals. The diode 14 can also prohibit a charge stored in the capacitor 13 from flowing from the lighting device input unit 10 to the signal receiving device 3, when the second DC voltage V2 (a voltage level thereof) is switched from the first voltage level V21 to the second voltage level V22 for each transmission time period of transmission signals. The lighting device 1 as stated above can prevent the variation in a voltage of the second DC voltage V2 to be input to the receiver input unit 30.

The light source 5 may have different kinds of LED modules, respective luminous colors of which are different from each other. For example, the light source 5 may have a first LED module configured to emit white light, and a second LED module configured to emit warm white light. Preferably, the lighting device 1 further includes a first constant current circuit configured to light the first LED module, and a second constant current circuit configured to light the second LED module. Transmission data representing a first dimming level of the first LED module and a second dimming level of the second LED module may be transmitted from the signal transmitting device 2 to the signal receiving device 3. The receiver circuit 31 of the signal receiving device 3 may convert the first dimming level from the signal transmitting device 2 into a PWM signal to supply the PWM signal to the first constant current circuit. Similarly, the receiver circuit 31 of the signal receiving device 3 may convert the second dimming level from the signal transmitting device 2 into a PWM signal to supply the PWM signal to the second constant current circuit. The first constant current circuit may cause a current corresponding to a target value represented by the PWM signal from the receiver circuit 31 to flow through the first LED module. The second constant current circuit may cause a current corresponding to a target value represented by the PWM signal from the receiver circuit 31 to flow through the second LED module. Accordingly, the light source 5 is to emit light obtained by mixing the white color from the first LED module and the warm white light from the second LED module. That is, the illumination fixture 6, the lighting system 4 and the illumination system 7 can adjust the luminous color of the light source 5 according to a ratio between the first dimming level and the second dimming level.

The transmission data are not limited to the dimming level. For example, when the illumination fixture is provided with a built-in speaker, an audio (music) file may be dealt as the transmission data. That is, the audio (music) can be output from the speaker of the illumination fixture by transmitting the audio (music) file as the transmission data from the signal transmitting device 2 to drive the speaker by the transmission data received with the signal receiving device 3.

As stated above, a signal receiving device 3 according to a first aspect includes a receiver input unit 30 and a receiver circuit 31. The receiver input unit 30 includes input terminals 30A and 30B and allows power supply lines (second power supply lines L2) to be electrically connected to. The receiver circuit 31 is (operatively) coupled to the receiver input unit 30. The receiver circuit 31 is configured to receive a transmission signal represented by a change in a DC voltage (a second DC voltage V2) (a voltage level thereof) applied across the power supply lines L2 according to transmission data. The receiver circuit 31 is configured to compare the second DC voltage V2 (the voltage level thereof) with a threshold Vth, thereby detecting the change in the second DC voltage V2 (the voltage level). The receiver circuit 31 is configured to calculate the threshold Vth from a voltage value of the second DC voltage V2 (a sampled value(s) of a detection voltage Vx) input to the receiver input unit 30, for example when a prescribed condition is satisfied. For example, the voltage value of the second DC voltage V2 may be an instantaneous voltage value of the second DC voltage V2 but preferably a moving average of voltage values of the second DC voltage V2.

With the signal receiving device 3 according to the first aspect, the receiver circuit 31 can set the threshold Vth in an appropriate range, for example when a condition, representing a high possibility that the second DC voltage V2 (a voltage level thereof) to be input to the receiver input unit 30 increases or decreases, is satisfied. The signal receiving device 3 according to the first aspect can therefore avoid noise-susceptibility of the transmission signal increasing.

In the signal receiving device 3 according to a second aspect that is realized in combination with the first aspect, the receiver circuit 31 is configured to, when the receiver circuit 31 is activated (when a first condition is satisfied), calculate the threshold Vth by subtracting (or adding) a fixed value (a change value) from (or to) the voltage value of the DC voltage V2 (the sampled value(s) of the detection voltage Vx).

The signal receiving device 3 according to the second aspect can avoid the noise susceptibility of the transmission signal increasing because the threshold Vth is set in an appropriate range whenever the receiver circuit 31 is activated.

In the signal receiving device 3 according to a third aspect that is realized in combination with the first or the second aspect, the receiver circuit 31 is preferably configured to, when the receiver circuit 31 receives the transmission signal (when a second condition is satisfied), calculate the threshold Vth from the voltage value, which is at least one of a maximum value and a minimum value of voltage values, of the second DC voltage V2 that changes according to the transmission signal. Note that the maximum value of the voltage values of the second DC voltage V2 is obtained from sampled values of the detection voltage Vx corresponding to the first voltage level V21, and the minimum value of the voltage values of the second DC voltage V2 is obtained from sampled values of the detection voltage Vx corresponding to the second voltage level V22.

The signal receiving device 3 according to the third aspect can further prevent noise susceptibility of the transmission signal from increasing because the threshold Vth is set in an appropriate range when the second DC voltage V2 (the voltage level thereof) changes according to content represented by the transmission data of the transmission signal.

In the signal receiving device 3 according to a fourth aspect that is realized in combination with the third aspect, the receiver circuit 31 is preferably configured to calculate the threshold Vth by calculating a difference between the maximum value and the minimum value to subtract (or add) a voltage value smaller than the difference from (or to) the voltage value of the second DC voltage V2 after receiving the transmission signal.

The signal receiving device 3 according to the fourth aspect can easily calculate the threshold Vth.

In the signal receiving device 3 according to a fifth aspect that is realized in combination with any one of the first to fourth aspects, preferably the condition is a difference(s) between the second DC voltage V2 (a voltage level thereof) (the sampled value(s) of the detection voltage Vx) and the threshold Vth is(are) out of a prescribed range. The receiver circuit 31 is preferably configured to, when a difference(s) between the second DC voltage V2 (a voltage level thereof) (the sampled value(s) of the detection voltage Vx) and the threshold Vth is(are) out of a prescribed range (when a third condition is satisfied), calculate the threshold Vth so that the difference(s) between the second DC voltage V2 (the voltage level thereof) (the sampled value(s) of the detection voltage Vx) and the threshold Vth is(are) not out of the prescribed range.

The signal receiving device 3 according to the fifth aspect can further avoid noise susceptibility of the transmission signal increasing because the threshold Vth is set in an appropriate range when the second DC voltage V2 (the voltage level thereof) changes significantly.

In the signal receiving device 3 according to a sixth aspect that is realized in combination with any one of the first to fifth aspects, the receiver circuit 31 is configured to calculate the threshold Vth based on a moving average of the voltage value of the second DC voltage V2.

In the signal receiving device 3 according to a seventh aspect that is realized in combination with any one of the first to fifth aspects, the receiver circuit 31 is configured to calculate the threshold Vth based on an instantaneous voltage value of the second DC voltage V2.

As stated above, a signal transmitting device 2 according to an eighth aspect includes an input unit 20, an output unit 21, a voltage converter circuit 22 and a control circuit 23. The input unit 20 includes input terminals 20A and 20B and is configured to receive a first DC voltage V1. The output unit 21 includes output terminals 21A and 21B and is configured to output a second DC voltage V2. The voltage converter circuit 22 is configured to convert the first DC voltage V1 into the second DC voltage V2. The control circuit 23 is configured to control the voltage converter circuit 22 so that the second DC voltage V2 (a voltage level thereof) is changed to a DC voltage level according to transmission data, during a prescribed transmission time period.

The signal transmitting device 2 according to the eighth aspect can transmit the transmission signal to any signal receiving device 3 of the first to seventh aspects.

In the signal transmitting device 2 according to a ninth aspect that is realized in combination with the eighth aspect, the second DC voltage V2 output by the voltage converter circuit 22 changes between a first DC voltage level and a second DC voltage level different from the first DC voltage level, in accordance with a respective binary state of the transmission data.

In the signal transmitting device 2 according to a tenth aspect that is realized in combination with the ninth aspect, the voltage converter circuit 22 includes a three-terminal regulator configured to output either the first DC voltage level or the second DC voltage level based on the binary state of the transmission data.

In the signal transmitting device 2 according to an eleventh aspect that is realized in combination with the ninth aspect, the voltage converter circuit 22 includes a switching regulator configured to output either the first DC voltage level or the second DC voltage level based on the binary state of the transmission data.

As stated above, a lighting system 4 according to a twelfth aspect includes any signal receiving device 3 of the first to seventh aspects, a signal transmitting device 2 and a lighting device 1. The signal transmitting device 2 includes an input unit 20, an output unit 21, a voltage converter circuit 22 and a control circuit 23. The input unit 20 includes input terminals 20A and 20B and is configured to receive a first DC voltage V1. The output unit 21 includes output terminals 21A and 21B and is configured to output a second DC voltage V2. The voltage converter circuit 22 is configured to convert the first DC voltage V1 into the second DC voltage V2. The control circuit 23 is configured to control the voltage converter circuit 22 so that the second DC voltage V2 (a voltage level thereof) is changed to a DC voltage level (a first voltage level V21 or a second voltage level V22) according to transmission data, during a prescribed transmission time period. The lighting device 1 is configured to light a light source 5 by the second DC voltage V2 supplied via the power supply lines (the power supply lines L2). The receiver circuit 31 of the signal receiving device 3 is configured to compare the second DC voltage V2 (the voltage level thereof) (a sampled value(s) of the detection voltage Vx) with the threshold Vth, thereby detecting the change in the second DC voltage V2 (the voltage level). The receiver circuit 31 is configured to change a state of the light source 5 (On state, Off state and dimming level) via the lighting device 1 according to the transmission signal received with the receiver circuit 31.

The lighting system 4 according to the twelfth aspect can avoid noise-susceptibility of the transmission signal increasing.

In the lighting system 4 according to a thirteenth aspect that is realized in combination with the twelfth aspect, the signal receiving device 3 is configured to cause the lighting device 1 to turn the light source 5 off when the threshold Vth calculated by the receiver circuit 31 is out of a prescribed allowable range.

The lighting system 4 according to the thirteenth aspect can suppress the occurrence of malfunction caused by the continuous flow of an excessive current.

In the lighting system 4 according to a fourteenth aspect that is realized in combination with the twelfth or thirteenth aspect, the lighting device 1 preferably includes a lighting device input unit 10, a lighting device output unit 11, a capacitor 13 and a diode 14. The lighting device input unit 10 includes input terminals 10A and 10B, and allows the power supply lines L2 to be electrically connected to. The lighting device output unit 11 includes output terminals 11A and 11B, and allows the light source 5 to be electrically connected to. The capacitor 13 allows the light source 5 to be electrically connected in parallel to via the lighting device output unit 11. The diode 14 is provided to allow a DC current to flow from the lighting device input unit 10 toward the lighting device output unit 11.

The lighting system 4 according to the fourteenth aspect can suppress the variation in the second DC voltage V2 to be input to the receiver input unit 30.

As stated above, an illumination fixture 6 according to a fifteenth aspect includes a signal receiving device 3 of any one of the first to the seventh aspects, a light source 5 and a lighting device 1 configured to light the light source 5. The lighting device 1 is configured to change a state of the light source 5 according to the transmission data acquired through the receiver circuit 31.

The illumination fixture 6 according to the fifteenth aspect can avoid the noise-susceptibility of the transmission signal increasing.

An illumination system 7 according to a sixteenth aspect includes a lighting system 4 of any one of the twelfth to fourteenth aspects, and the light source 5 to be lit by the lighting device 1 of the lighting system 4.

The illumination system 7 according to the sixteenth aspect can avoid the noise-susceptibility of the transmission signal increasing.

While the foregoing has described what are considered to be the best mode and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present teachings.

The invention claimed is:
1. A signal receiving device, comprising
a receiver input unit that comprises input terminals and that allows power supply lines to be electrically connected thereto, and
a receiver circuit that is operatively coupled to the receiver input unit, and configured to receive a transmission signal represented by a change in DC voltage applied across the power supply lines according to transmission data, the receiver circuit being configured to compare the DC voltage with a threshold, thereby detecting the change in the DC voltage, and the receiver circuit being configured to calculate the threshold from a voltage value of the DC voltage input to the receiver input unit.
2. The signal receiving device of claim 1, wherein
the receiver circuit is configured to, when the receiver circuit is activated, calculate the threshold by either subtracting or adding a fixed value from or to the voltage value of the DC voltage.
3. A signal receiving device of claim 1, wherein
the receiver circuit is configured to, when the receiver circuit also receives the transmission signal, calculate the threshold from the voltage value, which is at least one of a maximum value and a minimum value of voltage values, of the DC voltage that changes according to the transmission signal.

4. A signal receiving device of claim 2, wherein the receiver circuit is configured to, when the receiver circuit also receives the transmission signal, calculate the threshold from the voltage value, which is at least one of a maximum value and a minimum value of voltage values, of the DC voltage that changes according to the transmission signal.

5. The signal receiving device of claim 3, wherein the receiver circuit is configured to calculate the threshold by calculating a difference between the maximum value and the minimum value and either subtract or add a voltage value smaller than the difference from or to the voltage value of the DC voltage after receiving the transmission signal.

6. The signal receiving device of claim 4, wherein the receiver circuit is configured to calculate the threshold by calculating a difference between the maximum value and the minimum value and either subtract or add a voltage value smaller than the difference from or to the voltage value of the DC voltage after receiving the transmission signal.

7. A signal receiving device of claim 1, wherein the receiver circuit is configured to, when a difference between the DC voltage and the threshold is out of a prescribed range, calculate the threshold so that the difference between the DC voltage and the threshold is not out of the prescribed range.

8. The signal receiving device of claim 1, wherein the receiver circuit is configured to calculate the threshold based on a moving average of the voltage value of the DC voltage.

9. The signal receiving device of claim 1, wherein the receiver circuit is configured to calculate the threshold based on an instantaneous voltage value of the DC voltage.

* * * * *